June 17, 1952  J. E. RUEDY ET AL  2,600,579
METHOD OF MAKING PHOSPHOR SCREENS
Filed June 5, 1946
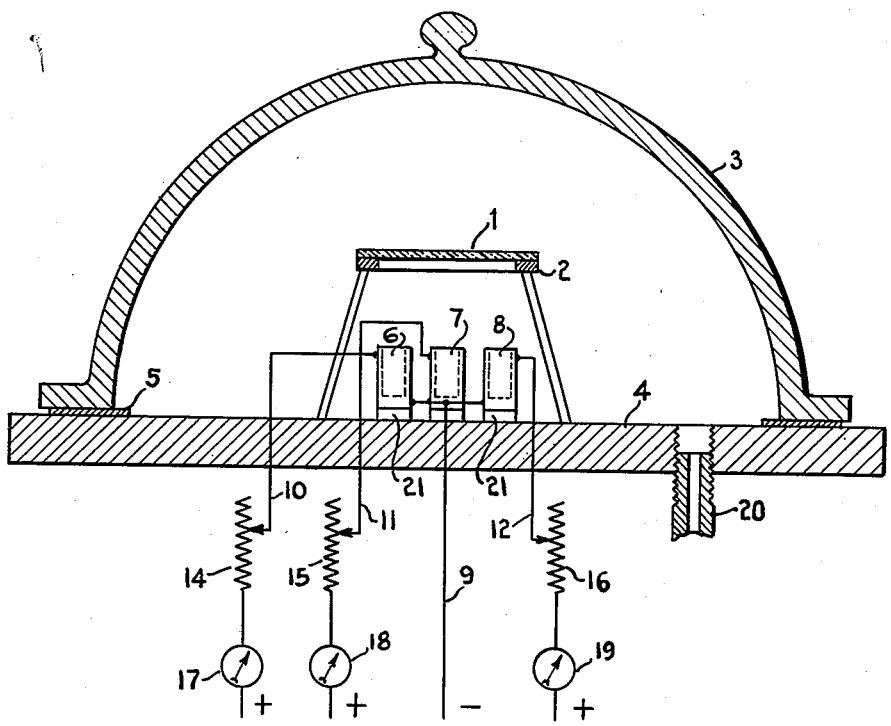
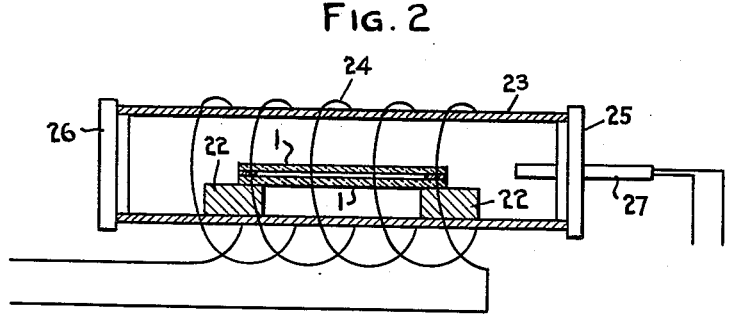
INVENTORS
JOHN E. RUEDY
FERD E. WILLIAMS
BY William A. Jalesak
ATTORNEY Patented June 17, 1952

2,600,579

UNITED STATES PATENT OFFICE 2,600,579

METHOD OF MAKING PHOSPHOR SCREENS

John E. Ruedy and Ferd E. Williams, Princeton, N. J., assignors to Radio Corporation of America, a corporation of Delaware Application June 5, 1946, Serial No. 674,587

4 Claims. (Cl. 117—33.5)

This invention relates to the making of phosphors for production of fluorescent light.

Phosphors, as a general rule, have been made by heating the proper mixture of compounds, including the activators, in a furnace and then cooling and grinding to the desired state of fineness for application to the phosphor base.

It has heretofore been found that a phosphor may be made by simultaneously evaporating zinc fluoride and manganese activator in the same crucible and condensing their vapors on a suitable body. This is satisfactory for zinc fluoride and manganese activator, as they have about the same volatility and the method provides good activation. We have, however, since found that, for many phosphor materials either with or without foreign activators, this method will not produce a suitable phosphor, either because they have too great a difference in volatility or a separate method of activation is required.

It is an object of our invention to provide a method of making a highly efficient phosphor of a material or materials, with or without foreign activators, some or all of which have widely different volatility.

It is a further object of our invention to provide a method of making a phosphor of sulphides and sulphoselenides of cadmium and zinc with or without silver or copper activators.

Other objects of our invention will appear in the following description, reference being had to the drawing, in which;

Fig. 1 is a section through the evaporating and condensing apparatus for carrying out our invention.

Fig. 2 is a section through a furnace for activation of the phosphor.

Our invention may be used with various phosphor materials, but we have found it particularly satisfactory for zinc and cadmium sulphide and zinc sulphoselenide, either with or without foreign activators such as silver or copper. In carrying out our process, a Pyrex glass disc 1 constituting the base for the phosphor is placed on a suitable stand 2 in the vacuum chamber, comprising a bell 3 resting on a base 4 with a gasket 5 to make an airtight joint. Adjacent the disc 1, say beneath it, are placed as many crucibles as are needed for carrying out the process. We have shown three of these, namely 6, 7 and 8, which may be platinum tubes with closed bottoms and open tops, containing the materials to be evaporated. For heating these crucibles it is convenient to connect one terminal 9 of the heating system to one end of the tube crucibles and leads 10, 11 and 12 from the other terminal are connected to the opposite end of the tube. These leads may include rheostats 14, 15 and 16 and ammeters 17, 18 and 19, so that proper current may be sent through the thin tubes to heat them to the desired temperature for vaporizing the contents inside the tube. To produce zinc sulphoselenide a proper vacuum would be maintained by connecting the pipe 20 to a suitable pump and the rheostats would be adjusted to vaporize, say, zinc sulphide in crucible 6, zinc selenide in crucible 7 and copper sulphide in crucible 8.

The simultaneous depositions of the various constituents are controlled in the following manner: A separate evaporation is made from each crucible (6, 7 and 8) upon Pyrex test discs at accurately known distances and heating currents for known lengths of time and the resulting deposits on the test discs weighed by means of a micro-balance. From this, the rates of evaporation of the constituents are determined and the relative rates of simultaneous deposition for the final phosphor synthesis may be fixed by adjusting with spacers 21 the distances (according to the inverse square law) of the different crucibles 6, 7 and 8 from the Pyrex disc 1 and heating each at its predetermined current.

The vapors from the three materials condense on the under side of the Pyrex disc 1 and the proper thickness can be determined by observing the colored rings produced by light interference phenomena. It has heretofore been supposed that heating the activator to its vaporizing temperature and condensing it with the phosphor material was sufficient for activation purposes, but we have found that this is not the case with these phosphors. To make an efficient phosphor out of the condensed materials, it is necessary to separately activate them.

To accomplish the activation of the condensed materials, we take two discs that have been treated by the process above outlined and place them almost together, with the condensed materials on the inside. We have found that a suitable separation is the thickness of the usual microscope cover glass. These two discs, as thus assembled, are placed on suitable supports 22 inside any desired type of furnace, such as a tube 23 having a heating coil 24 and ends 25, 26. With the heating coil arranged with the phosphor-deposited layer facing each other in the way described, there is no attempt to evacuate the oven and atmospheric air may be left therein. One of the ends may have a temperature-indicating device 27, such as a thermocouple. The oven is heated to a temperature of from 400° to 650° for approximately one hour.

If no copper or silver activator is to be used in the phosphor and activation is solely to be produced by what free zinc is dissociated from the selenides or sulphides, then the zinc sulphide and zinc selenide alone will be heated to condense their vapors on the Pyrex disc 1.

If a phosphor of zinc cadmium sulphide with a, say, silver activator is to be produced, the zinc sulphide would be placed in, say, crucible 6, cadmium sulphide in crucible 7 and a silver salt in crucible 8 at the proper relative distances and simultaneously heated at predetermined currents, as previously described. After these materials have been condensed on the discs, they are placed in the oven in the way already described and activated by heating to the temperature mentioned. If zinc cadmium sulphide is to be used without a foreign activator, then no activator would be placed in a crucible, such as 8, and the zinc cadmium sulphide would be condensed on the disc, but nevertheless the zinc cadmium sulphide deposit on the Pyrex glass must be separately activated by heating to the temperature mentioned in a separate step.

We have found that the atmosphere adjacent the condensed material on the Pyrex discs has a great deal to do with the production of an efficient phosphor by the separate activation step. If the surface is activated in atmospheric air, an inefficient phosphor results. If, however, the oven shown in Fig. 2 is filled with nitrogen instead of air, a fairly efficient phosphor results. However, the most efficient phosphor that we have been able to produce is activated in substantially its own vapor. The placing of the two discs with the phosphor surface adjacent each other with a very thin spacing between them does not exclude the air in the sense that no air exists between the plates, but this space is so small that when heat is applied it is believed that sufficient vapor is produced adjacent the film surface to remove the air from contact with the deposited film and a very efficient phosphor results by this form of activation. The phosphor during activation is essentially in an atmosphere of its own vapor.

By our process we produce directly on the target base to be incorporated in the cathode ray tube a very thin film that is uniform, non-grainy and homogeneous.

We have also produced zinc sulphide phosphor, as well as zinc selenide phosphor by evaporating each of these salts and then separately activating them in the way described, but the combination of the two makes the best phosphor. This may be due to some effect produced by the sulphoselenide, or it may be due to the mutual fluxing action of the two salts in the activation process.

We claim:

1. The method of making a phosphor screen on a plurality of supports from a phosphor compound formed of a metal from the group consisting of zinc and cadmium and mixtures thereof and of a non-metal from the group consisting of sulfur and selenium and mixtures thereof, said method comprising the steps of, arranging said compound adjacent said supports within a vacuum, vaporizing said compound, condensing the vapors of said compound to form a coating of the condensate on a surface of said base members, placing two coated surfaces of said base members face to face and closely adjacent to each other, activating said condensate at atmospheric pressure by heating said base member to a temperature between 400° C. and 650° C., and separating said base members from each other to provide a support having an outer film of activated phosphor material.

2. The method of making a phosphor screen from a phosphor compound formed of a metal from the group consisting of zinc and cadmium and mixtures thereof, and of a non-metal from the group consisting of sulfur and selenium and mixtures thereof, said method comprising the steps of, simultaneously vaporizing in a vacuum said compound and an activator, condensing the vapor of said compound and activator to form a coating of the condensates on a surface of a plurality of base members, placing two coated surfaces of said base members face-to-face and closely adjacent to each other, activating said phosphor compound by heating said coated base members at atmospheric pressure to a temperature between 400° C. and 650° C., and separating said base members from each other to form a support having an outer film of activated phosphor material.

3. The method of making a phosphor screen on a plurality of support members from zinc sulphide and an activator, said method comprising steps of, arranging within a vacuum said zinc sulphide and said activator adjacent said supports, vaporizing said zinc sulphide and said activator, condensing the vapors of said zinc sulphide and activator on at least one surface of each of said support members, placing two coated surfaces of said support members face to face and closely adjacent to each other, activating said zinc sulphide phosphor by heating said base members and said condensates to a temperature between 400° C. and 650° C. and substantially solely in the vapors of said condensates thereof, and separating said support members from each other to provide supports each having an outer film of activated phosphor material.

4. The method of making a phosphor screen from zinc and cadmium sulphides and an activator, said method comprising the steps of, simultaneously vaporizing in a vacuum said zinc and cadmium sulphide and said activator, condensing the vapors of said zinc and cadmium sulphides and activator to form a coating of the condensates on a surface of a plurality of base members, placing two coated surfaces of said base members face to face and closely adjacent to each other, heating said two coated base members and the condensates thereon to a temperature between 400° C. and 650° C. substantially solely in the vapors of said condensates and at atmospheric pressure, and separating said two coated base members from each other to form a support having an outer film of activated phosphor material.

JOHN E. RUEDY.
FERD E. WILLIAMS.

REFERENCES CITED

The following references are of record in the file of this patent:

UNITED STATES PATENTS

| Number | Name | Date |
|---|---|---|
| 1,954,691 | De Boer | Apr. 10, 1934 |
| 2,151,457 | Williams | Mar. 21, 1939 |
| 2,238,026 | Moore | Apr. 8, 1941 |
| 2,280,939 | Weinhart | Apr. 28, 1942 |

FOREIGN PATENTS

| Number | Country | Date |
|---|---|---|
| 526,320 | Great Britain | Sept. 16, 1940 |